United States Patent [19]
Baas

[11] Patent Number: 4,803,676
[45] Date of Patent: Feb. 7, 1989

[54] CIRCUITRY FOR AN AUDIO OR VIDEO DISK PLAYER

[75] Inventor: Dieter Baas, Kehl, Fed. Rep. of Germany

[73] Assignee: Deutsche Thomson-Brandt GmbH, Villingen-Schwenningen, Fed. Rep. of Germany

[21] Appl. No.: 945,575
[22] PCT Filed: Mar. 8, 1986
[86] PCT No.: PCT/EP86/00126
  § 371 Date: Dec. 22, 1986
  § 102(e) Date: Dec. 22, 1986
[87] PCT Pub. No.: WO86/05308
  PCT Pub. Date: Sep. 12, 1986

[30] Foreign Application Priority Data

Mar. 9, 1985 [DE] Fed. Rep. of Germany ....... 3508422

[51] Int. Cl.[4] .................... G11B 19/20; G11B 21/10
[52] U.S. Cl. .................................................. 369/143
[58] Field of Search .................. 369/32, 43, 44, 45, 369/46, 111; 318/592, 593, 594, 595, 615, 616; 360/77, 78; 358/342

[56] References Cited

U.S. PATENT DOCUMENTS

| | | | |
|---|---|---|---|
| 4,037,252 | 7/1977 | Janssen | 369/46 |
| 4,234,837 | 11/1980 | Winslow | 369/44 |
| 4,330,880 | 5/1982 | Van Dijk | 369/32 |
| 4,494,154 | 1/1986 | Akiyama | 369/32 |
| 4,498,158 | 2/1985 | Akiyama | 369/32 |
| 4,567,533 | 1/1986 | Assink | 369/32 |

FOREIGN PATENT DOCUMENTS

| | | |
|---|---|---|
| 3346112 | 7/1984 | Fed. Rep. of Germany . |
| 53-147509 | 12/1978 | Japan . |
| 55-38686 | 3/1980 | Japan . |
| 57-44234 | 2/1982 | Japan . |
| 58-169343 | 10/1983 | Japan . |
| 59-148185 | 8/1984 | Japan . |

Primary Examiner—Donald McElheny, Jr.
Attorney, Agent, or Firm—Max Fogiel

[57] ABSTRACT

An arrangement for obtaining precise scanning of audio and/or video disks with contactless scanning. A combination of coarse and fine drives serve to effect radial servo-readjustment. A radial error signal is applied to a comparator, so that when the radial error signal exceeds the threshold value set by the comparator, the coarse drive is driven with full operational voltage. The precision or fine drive has a control parameter which provides the radial error signal for operating the coarse drive. The comparator has a variable threshold for detecting the direction in which the coarse drive is to be driven.

11 Claims, 3 Drawing Sheets

CIRCUITRY FOR AN AUDIO OR VIDEO DISK PLAYER

BACKGROUND OF THE INVENTION

The invention concerns for an audio or video disk player.

Carrying out the requisite servo track readjustment by means of coarse-drive and precision-drive mechanisms, whereby the coarse-drive mechanism always carries out a motion once a prescribed threshold attained by integration of a radial error signal has been attained, is known for a track-guidance system for players for playing back audio and/or video disks. The function of the precision-drive mechanism is to rapidly control radial fluctuations in the track up to specific amplitudes.

The drawback to this known system is that the coarse-drive mechanism rotates irregularly once the response voltage for the coarse-drive mechanism has been attained. This is due to the more or less extensive and random energy consumption of the coarse-drive mechanism and its differing start-up action.

SUMMARY OF THE INVENTION

The object of the invention is to provide a circuit for a track-readjustment system that will ensure unobjectionable collaboration between the precision-drive and coarse-drive mechanisms.

The invention will now be specified with reference to the drawings.

p BRIEF DESCRIPTION OF THE DRAWINGS

FIG. 1 illustrates a known radial servo circuit with coarse-drive and precision-drive mechanisms, FIG. 2 illustrates a threshold component in the form of a comparator, FIG. 3 illustrates a threshold component with three comparators, and FIG. 4 illustrates a threshold component for the weighted deactivation of the coarse-drive mechanism by means of an a/d (analog to digital) converter.

DESCRIPTION OF THE PREFERRED EMBODIMENTS

Figure 1:
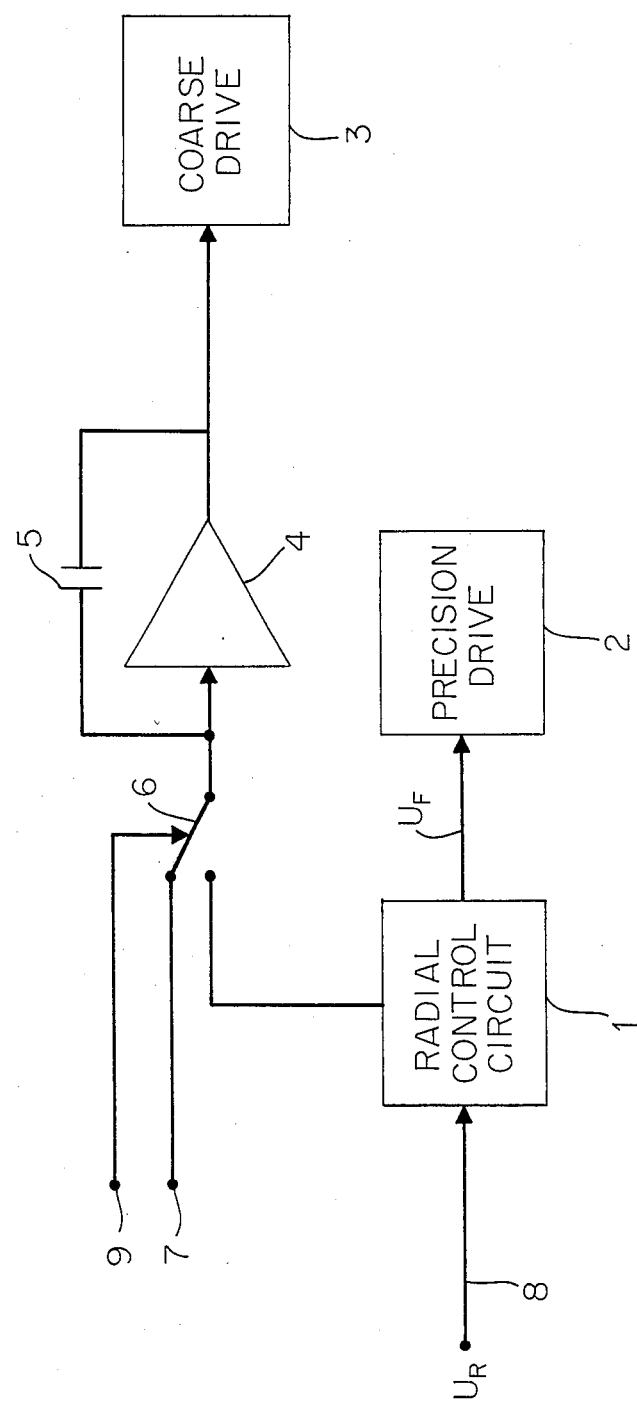

FIG. 1 illustrates a known radial servo circuit with coarse-drive (coarse positioning actuator) and precision-drive mechanisms (fine tracking actuator). A radial-error signal $U_R$ is supplied to the servo circuit. A radial control circuit 1 processes error signal 8 and supplies on the one hand a control signal $U_F$ for precision-drive mechanism 2 and also a control signal that assumes starting up of coarse-drive mechanism 3 through an integrator 4 and 5. For SEARCH, a SEARCH-control signal 9 changes a switch 6 to SEARCH signal 7 and starts coarse-drive mechanism 3 moving.

The known devices derive an electric signal from the servo circuit for precision-drive mechanism 2 that is supplied to coarse-drive mechanism 3 through integrator 4 and 5. The particular error signals $U_R$, which provide for the control of precision-drive mechanism 2, are all integrated up until the voltage at the output terminal of integrator 4 and 5 is high enough for coarse-drive mechanism 3 to carry out a rotation. This makes the precision-drive mechanism skip back until coarse-drive mechanism 3 comes into play again as the result of integration.

The drawback to this known system is that, once the response voltage for coarse-drive mechanism 3 has been attained, the mechanism executes a rotation of varying extent. This is due to the more or less extensive and random energy consumption of the coarse-drive mechanism and to its variable start-up action as the result of friction and manufacturing tolerances.

The back-skip of precision-drive mechanism 2 is accordingly variable in extent, so that the optimum operating range for precision-drive mechanism 2 can be exceeded. Unobjectionable scanning can then no longer be ensured. In order to ensure unobjectionable scanning in spite of this, coarse-drive mechanism 3 must be employed with high precision. Variations in the friction or pole sensitivity of the coarse-drive mechanism for example can occasion variations in the angle of rotation when the response voltage is attained. Furthermore, the response voltage can vary in strength depending on the position of the driveshaft. The consequence is also undesirable and indefinite rotations on the part of the coarse-drive mechanism.

In the SEARCH mode, the scanner will execute a long radial skip. When the servo loop for precision-drive mechanism 2 is closed and the motion of coarse-drive mechanism 3 is not yet completely concluded, the prescribed operating range can be abandoned due to transience activity on the part of precision-drive mechanism 2. The result is incorrect scanning, malfunction in playback that is. When there are SEARCH skips, therefore, the precision-drive must not be switched on until the coarse-drive mechanism has completely stopped moving. This of course involves undesirably long access times.

Figure 2:
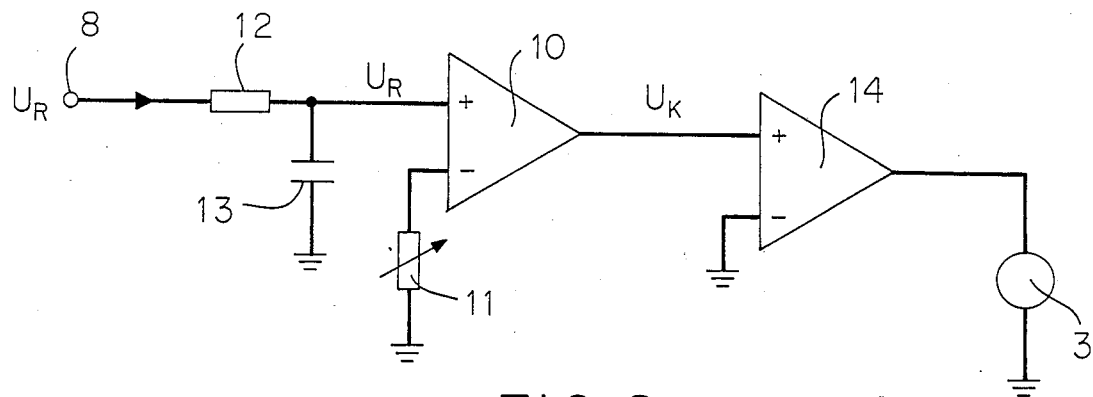

FIG. 2 illustrates the system for activating a coarse-drive mechanism 3 with a comparator 10 as threshold detector. A radial-error signal $U_R$ is supplied by input terminal 8 through an RC stage 12 and 13 to the non-inverting input terminal of a comparator 10. The inverting input terminal of comparator 10 is connected to reference-voltage level through an adjustable resistor 11 that controls the threshold of comparator 10. When the threshold of comparator 10 is exceeded, the output signal $U_K$ from comparator 10 starts coarse-drive mechanism 3 up through an operational amplifier 14, and the mechanism immediately starts moving due to the complete operational voltage derived from amplifier 14. The coarse-drive mechanism continues rotating until radial-error signal $U_R$ drops below the threshold of comparator 10.

Figure 3:
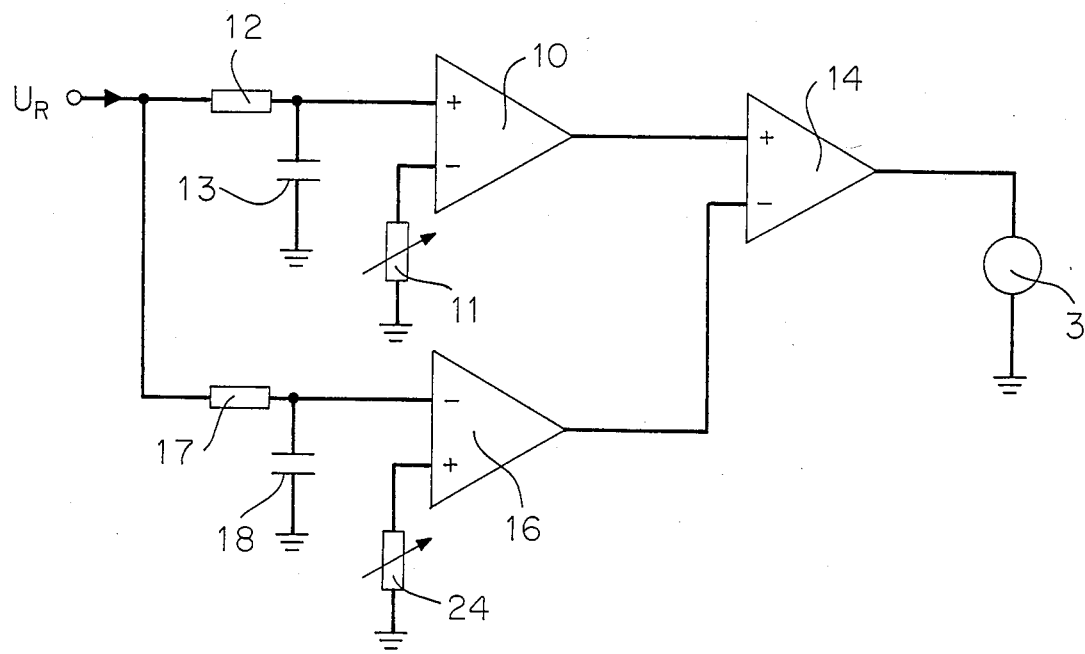

FIG. 3 illustrates a system like that illustrated in FIG. 2 that employs another comparator 16. The circuit is designed so that comparator 16 will start coarse-drive mechanism 3 moving in the opposite direction once the threshold established by resistor 24 has been attained.

Figure 4:
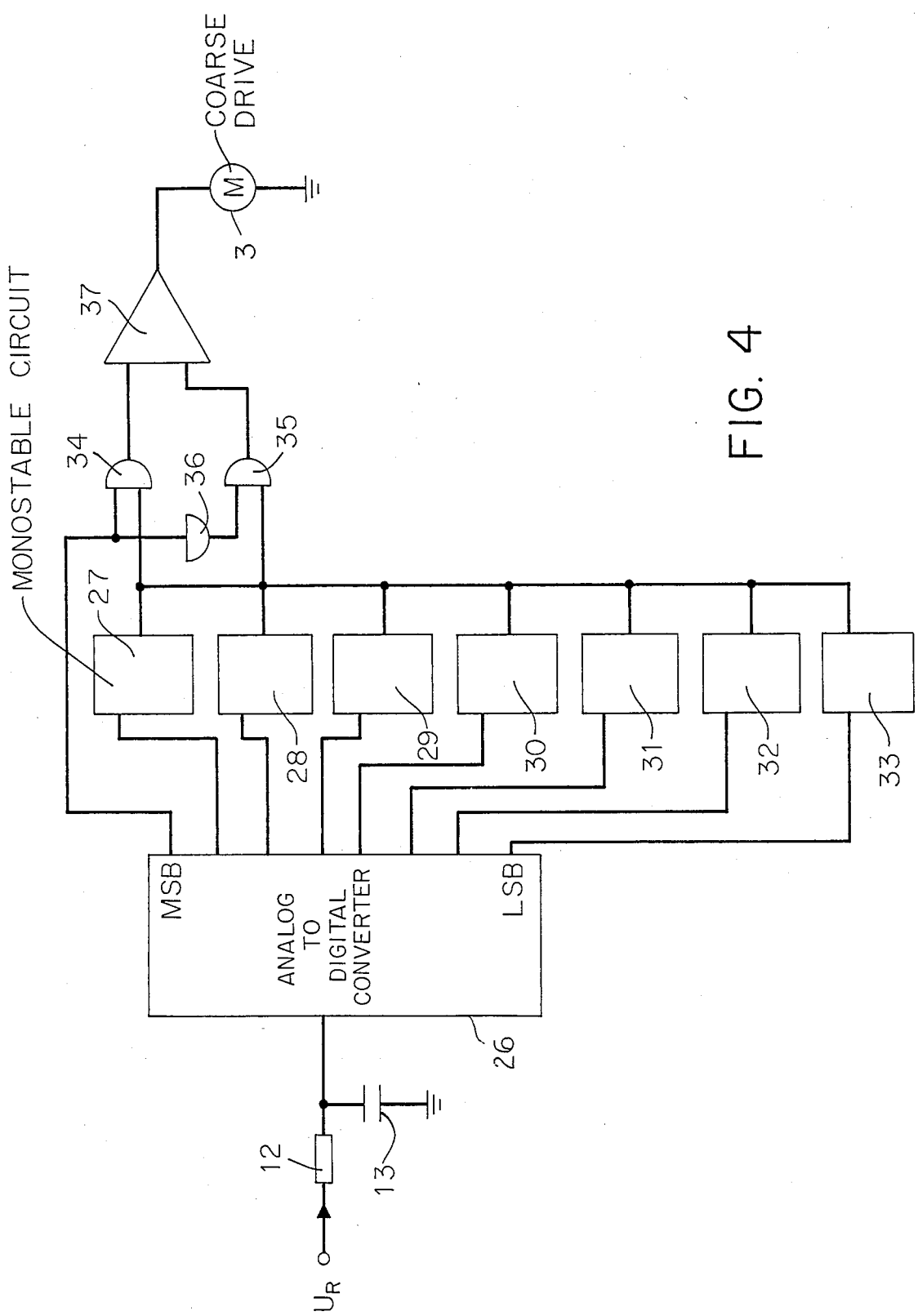

FIG. 4 illustrates an embodiment with an a-d (analog to digital) converter 26 that radial-error signal $U_R$ is supplied to through a low-pass filter 12 and 13. The output terminals of a-d converter 26 are connected to monostable flip-flops 27 to 33 with differing time constants $\tau \ldots, \tau$ that increase from the LSB to the MSB of a-d converter 26. Most significant bit MSB is employed to detect direction and is connected through an AND gate 34 to the non-inverting input terminal and through an inverter and another AND gate 35 to the inverting input terminal of an amplifier 37. Every other input terminal of AND gates 34 and 35 is connected to an output terminal of one of monostable flip-flops 27 to 33, which are employed for weighted control. This allows precise control even with simply designed coarse-drive mechanisms 3.

The aforesaid drawback with respect to track skipping of the state-of-the-art device illustrated in FIG. 1 is eliminated by the design in accordance with the invention. When the servo circuit for precision-drive mechanism 2 is closed subsequent to a track skip, even a follow-up on the part of coarse-drive mechanism 3 can have no effect on scanning because the weighted radial-error signal $U_R$ will immediately correct the position of precision-drive mechanism 2. It should also be noted that the system specified herein is also insensitive when undesired mechanical acceleration is present during the track skipping and at the instant precision-drive mechanism 2 comes into action.

I claim:

1. An arrangement for an audio or video disk player with remote scanning by a scanning component for carrying out servo track readjustment in a track guidance system, comprising:
   a combination of coarse-drive means and fine precision-drive means for radial servo readjustment of said scanning component;
   having a control parameter providing a radial-error signal for operating said coarse-drive means;
   means for applying pulses dependent on said radial-error signal to said coarse-drive means for starting up said coarse-drive means;
   said precision-drive means comprising a fine tracking actuator and said coarse-drive means comprising a coarse positioning actuator;
   a processing circuit for receiving said radial-error signal, said processing circuit having a comparator with a variable threshold for detecting the direction in which said coarse-drive means is to be driven.

2. An arrangement as defined in claim 1, wherein said comparator comprises a first comparator with a first threshold;
   a second comparator with a second threshold, said coarse-drive means being driven in one direction when said first comparator detects said first threshold, said coarse-drive means being driven in an opposite direction when said second comparator detects said second threshold.

3. An arrangement as defined in claim 1, including an analog to digital converter for receiving said radial-error signal.

4. An arrangement as defined in claim 3, wherein said analog to digital converter has an output signal with a most significant bit for determining the direction in which said coarse-drive means is to be started up.

5. An arrangement as defined in claim 1, wherein said comparator has an output signal for directly starting to drive said coarse-drive means.

6. An arrangement as defined in claim 1, including means for applying pulses to said coarse-drive means for driving said coarse-drive means when said radial-error signal has a maximum value exceeding a predetermined threshold.

7. An arrangement as defined in claim 6, wherein said pulses are of equal duration.

8. An arrangement as defined in claim 6, wherein said pulses are of varying duration.

9. An arrangement as defined in claim 6, including at least one monostable flip-flop circuit for generating said pulses.

10. An arrangement as defined in claim 1, wherein said comparator comprises a first comparator with a first threshold;
    a second comparator in said processing circuit with a second threshold, said coarse-drive means being driven in one direction when said first comparator detects said first threshold, said coarse-drive means being driven in an opposite direction when said second comparator detects said second threshold;
    an analog to digital converter for receiving said radial-error signal, said analog to digital converter having an output signal with a most significant bit for determining the direction in which said coarse-drive means is to start it to drive;
    monostable flip-flops actuated by bits in an output signal of said second comparator for determining the width of pulses for starting to drive said coarse-drive means.

11. An arrangement for an audio or video disk player with remote scanning by a scanning component for carrying out servo track readjustment in a track guidance system, comprising:
    a combination of coarse-drive means and fine precision-drive means for radial servo readjustment of said scanning component;
    having a control parameter providing a radial-error signal for operating said coarse-drive means;
    means for applying pulses dependent on said radial-error signal to said coarse-drive means for starting up said coarse-drive means;
    said precision-drive means comprising a fine tracking actuator and said coarse-drive means comprising a coarse positioning actuator;
    a processing circuit for receiving said radial-error signal, said processing circuit having a comparator with a variable threshold for detecting the direction in which said coarse-drive means is to be driven;
    said comparator comprising a first comparator with a first threshold;
    a second comparator with a second threshold, said coarse-drive means being driven in one direction when said first comparator detects said first threshold, said coarse-drive means being driven in an opposite direction when said second comparator detects said second threshold;
    an analog to digital converter for receiving said radial-error signal;
    said analog to digital converter having an output signal with a most significant bit for determining the direction, said coarse-drive means is to be started in driving, means for applying pulses to said coarse-drive means for driving said coarse-drive means when said radial-error has a maximum value exceeding a predetermined threshold;
    monostable flip-flops actuated by an output signal with bits from said second comparator for determining the width of pulses to start driving said coarse-drive means.

* * * * *